US009355187B2

(12) United States Patent
Ha

(10) Patent No.: US 9,355,187 B2
(45) Date of Patent: May 31, 2016

(54) IMAGE FORMING APPARATUS TO PROVIDE DATA INFORMATION AND AN IMAGE FORMING METHOD THEREOF

(75) Inventor: Jun-hyung Ha, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1652 days.

(21) Appl. No.: 11/679,398

(22) Filed: Feb. 27, 2007

(65) Prior Publication Data

US 2008/0024813 A1 Jan. 31, 2008

(30) Foreign Application Priority Data

Jul. 25, 2006 (KR) .................. 10-2006-0069744

(51) Int. Cl.
| | |
|---|---|
| G06K 15/00 | (2006.01) |
| G06F 17/30 | (2006.01) |
| H04N 1/00 | (2006.01) |
| H04N 1/32 | (2006.01) |
| G06F 3/12 | (2006.01) |

(52) U.S. Cl.
CPC .......... *G06F 17/30899* (2013.01); *G06F 3/121* (2013.01); *G06F 3/1207* (2013.01); *G06F 3/1219* (2013.01); *G06F 3/1259* (2013.01); *G06F 3/1265* (2013.01); *G06F 3/1288* (2013.01); *H04N 1/00244* (2013.01); *H04N 1/32641* (2013.01); *H04N 1/32657* (2013.01); *H04N 1/00291* (2013.01); *H04N 2201/0082* (2013.01)

(58) Field of Classification Search
USPC ................ 358/1.15, 1.14, 1.18, 3.06; 399/27; 348/14.02; 710/33; 709/206, 229, 236
See application file for complete search history.

(56) References Cited

U.S. PATENT DOCUMENTS

| | | | | |
|---|---|---|---|---|
| 5,307,501 | A * | 4/1994 | Yuge | 709/229 |
| 5,841,844 | A * | 11/1998 | Park | 379/100.14 |
| 6,351,317 | B1 * | 2/2002 | Sasaki et al. | 358/1.15 |
| 6,633,400 | B1 * | 10/2003 | Sasaki et al. | 358/1.15 |
| 6,657,743 | B1 * | 12/2003 | Otsuka et al. | 358/1.15 |
| 6,754,455 | B2 * | 6/2004 | Kawase | 399/27 |
| 6,801,962 | B2 * | 10/2004 | Taniguchi et al. | 710/33 |
| 6,982,801 | B1 * | 1/2006 | Saito | 358/1.15 |
| 6,993,562 | B2 * | 1/2006 | Treptow et al. | 709/206 |
| 7,035,874 | B1 * | 4/2006 | Reed et al. | |
| 7,079,276 | B2 * | 7/2006 | Kimura | 358/1.15 |
| 7,194,548 | B1 * | 3/2007 | Matsumi et al. | 709/236 |
| 7,224,381 | B2 * | 5/2007 | Inoue | 348/14.02 |

(Continued)

FOREIGN PATENT DOCUMENTS

| | | |
|---|---|---|
| JP | 2001-014120 | 1/2001 |
| JP | 2006-172178 | 6/2006 |

OTHER PUBLICATIONS

Korean Office Action dated Feb. 5, 2013 issued in KR Application No. 10-2006-0069744.

*Primary Examiner* — Ashish K Thomas
(74) *Attorney, Agent, or Firm* — Staas & Halsey LLP

(57) ABSTRACT

An image forming apparatus to provide data information and an image forming method using the same. The image forming apparatus includes a control unit to confirm whether data exists from a server that corresponds to a uniform resource location (URL) of the data if the URL of the data is received, and a user interface unit to provide a user interface to display whether the data exists. Accordingly, malfunction of the image forming apparatus and unnecessary printing can be prevented.

24 Claims, 9 Drawing Sheets

(56) References Cited

U.S. PATENT DOCUMENTS

| | | | |
|---|---|---|---|
| 7,253,919 B2* | 8/2007 | Hull et al. | 358/1.18 |
| 7,286,266 B2* | 10/2007 | Fujita | 358/3.06 |
| 7,321,439 B2* | 1/2008 | Takagi et al. | 358/1.15 |
| 7,477,412 B2* | 1/2009 | Miwa et al. | 358/1.15 |
| 7,515,289 B2* | 4/2009 | Ohtuka | 358/1.15 |
| 7,528,973 B2* | 5/2009 | Enomoto et al. | 358/1.15 |
| 7,528,976 B2* | 5/2009 | Hart et al. | 358/1.15 |
| 7,706,014 B2* | 4/2010 | Narusawa et al. | 358/1.18 |
| 2002/0030842 A1* | 3/2002 | Iida | 358/1.14 |
| 2004/0143566 A1* | 7/2004 | Fukasawa | 707/1 |
| 2004/0257611 A1* | 12/2004 | Kito | 358/1.15 |
| 2007/0086051 A1* | 4/2007 | Kunori | 358/1.15 |
| 2007/0091364 A1* | 4/2007 | Kim et al. | 358/1.15 |
| 2007/0097416 A1* | 5/2007 | Higashimura et al. | 358/1.15 |
| 2007/0174293 A1* | 7/2007 | Kim et al. | 707/10 |
| 2007/0274691 A1* | 11/2007 | Chiba | 386/125 |
| 2009/0128447 A1* | 5/2009 | Yoshikawa et al. | 345/1.1 |
| 2009/0237721 A1* | 9/2009 | Jeong et al. | 358/1.15 |

* cited by examiner

IMAGE FORMING APPARATUS TO PROVIDE DATA INFORMATION AND AN IMAGE FORMING METHOD THEREOF

CROSS-REFERENCE TO RELATED APPLICATIONS

This application claims priority under 35 U.S.C. §119(a) of Korean Patent Application No. 2006-69744, filed Jul. 25, 2006, the contents of which are hereby incorporated in its entirety by reference.

BACKGROUND OF THE INVENTION

1. Field of the Invention

The present general inventive concept relates to an image forming apparatus to provide data information and an image forming method using the same. More particularly, the present general inventive concept relates to an image forming apparatus to provide data information and an image forming method using the same, which can provide information corresponding to data by confirming in advance whether the date exists and originates from a server corresponding to a uniform resource location (URL) of the data during a universal plug and play (UPnP) printing service.

2. Description of the Related Art

A home network system is a system that makes it possible to communicate among home devices and to connect to the Internet by providing a separate communication function in a home device. That is, the home network system is a technology that can control main home devices such as a DTV, a refrigerator, an air conditioner, a microwave oven, etc., through a wired or wireless network. In the home network system, a user can control the home devices by using a remote controller or a portable terminal inside or outside the house.

Home devices may be classified into information devices, such as a personal computer, a scanner, a facsimile, a printer, etc., audio/video (A/V) devices, such as a DTV, a set top box, a VCR, a DVD, a camcorder, an audio player, etc., control devices such as an electric rice cooker, a refrigerator, a washing machine, a microwave oven, etc., and dummy devices such as a remote controller, an interphone, a sensor, etc. These home devices are connected to phone lines, wireless LAN or Bluetooth, USB, IEEE 1394, power lines, etc.

The home network system provides paths through which the information devices, A/V devices, control devices, and dummy devices can send and/or receive data by using universal plug and play (UPnP) that is middleware. Also, the home network system achieves intelligent communications by providing connections to an external communication network, and maximizes sharing of information resources at home and utility of individual devices through networking.

FIG. 1 is a view schematically illustrating a conventional home network system. As illustrated in FIG. 1, the home network system performs data transmission and/or reception among a printer 11, a DTV 13, and a computer server 15, using a universal plug and play (UPnP), and performs printing through a UPnP printing service.

For example, if the DTV 13 transmits a uniform resource location (URL) of print data to be printed to the printer 11, the printer 11 requests the print data from the server that corresponds to the URL of the print data. Accordingly, the printer 11 receives the print data from the server 15, and prints the print data.

If the DTV 13 transmits the print data to the printer 11 in a state that a URL of data to be printed (hereinafter referred to as "attachment data") is included in the print data, the printer 11 requests the attachment data from the server 15 that corresponds to the URL of the attachment data. Accordingly, the printer 11 receives the attachment data from the server 15, and prints the attachment data.

With reference FIG. 1, is a flowchart illustrating a conventional image forming method using a UPnP printing service. The printer 11 confirms the type of the print data in operation S23 when a print command is received from the DTV 13 in operation S21. The print data can be received simultaneously with the reception of the print data, and the received print data may be classified into URL type print data and file type print data.

If the file type print data is received in operation S23, the printer analyzes the print data in operation S25. As a result of analysis, the printer confirms whether the URL of the attachment data is included in the print data in operation S27. If the URL of the attachment data is not included in the print data in operation S27, the printer performs a rendering of the print data in operation S29, and prints the print data in operation S31.

If the URL of the attachment data is included in the print data in operation S27, the printer requests the attachment data from the server 15 that corresponds to the URL of the attachment data in operation S37, and receives the attachment data from the server 15 in operation S39. The printer may confirm whether another attachment data exists in the print data in operation S41, and if another attachment data does not exist as a result of confirmation in operation S41, the printer performs a rendering of the print data in operation S29, and prints the print data in operation S31.

In contrast, if another attachment data exists as a result of confirmation in operation S41, the printer performs the process in operation S37 again. Accordingly, the printer sequentially confirms the attachment data in the print data, and repeats the above process until all the attachment data in the print data are confirmed.

If the attachment data is not received from the server in operation S39, a space, in which the attachment data in the print data is to be printed, is marked by "X" characters. Accordingly, the printer performs a rendering of the characters and the print data in operation S29, and prints the print data in operation S31.

In contrast, if the URL type print data is received in operation S23, the printer requests the print data from the server 15 that corresponds to the URL of the print data in operation S33, and receives the print data in operation S35. If the print data is not received in operation S35, the printing operation is abnormally interrupted.

As described above, according to the conventional printing method through a UPnP printing service, if the print data requested to the server is not received, the printing is abnormally interrupted, and this may cause the printer to malfunction.

In addition, even if the attachment data requested to the server is not received, the printing is performed as usual, with the attachment data not indicated, resulting in unnecessary printing.

SUMMARY OF THE INVENTION

The present general inventive concept provides an image forming apparatus to provide data information and an image forming method using the same, which can prevent malfunction of the image forming apparatus and unnecessary printing by confirming in advance whether the data exists and originates from a server corresponding to a uniform resource location (URL) of the data during a universal plug and play (UPnP) printing service.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may also be achieved by providing an image forming apparatus, including a control unit to confirm whether data exists from a server that corresponds to a uniform resource location (URL) of the data if the URL of the data is received, and a user interface unit to provide a user interface to display whether the data exists.

The data may be print data.

The control unit may receive and print the print data from the server if the print data exists in the server, while if the print data does not exist in the server, the control unit may control the user interface unit to provide the user interface for displaying a print rejection.

The data may be at least one attachment data included in the print data.

The control unit may receive and print the attachment data from the server if the attachment data exists in the server, while if the attachment data does not exist in the server, the control unit may control the user interface unit to provide the user interface to display the nonexistence of the attachment data.

The control unit may receive and analyze the print data from the server if the print data exists in the server, and if the print data includes a URL that corresponds to at least one attachment data as a result of analysis, the control unit may confirm whether the attachment data exists from the server that corresponds to the URL of the respective attachment data.

If it is judged that the attachment data exists, the control unit may receive the attachment data from the server that corresponds to the URL of the respective attachment data, attach the attachment data to the print data, and print the data, while if it is judged that the attachment data does not exist, the control unit may control the user interface unit to provide the user interface to display an indication that the attachment data does not exist.

The control unit may receive a part of the attachment data from the server, confirm a format of the attachment data if the attachment data exists in the server, and control the user interface unit to provide the user interface to display the confirmed format of the attachment data.

The format of the attachment data may be at least one of a JPEG (Joint Photographic Coding Experts Group), TIFF (Tag Image File Format), PDF (Portable Document Format), GIF (Graphics Interchange Format), and BMP (BitMaP).

The control unit may confirm whether the server operates, and control the user interface unit to provide the user interface to display whether the server operates.

The foregoing and/or other aspects and utilities of the present general inventive concept may also be achieved by providing an image forming method including receiving a uniform resource location (URL) of data, confirming whether the data exists from a server that corresponds to the URL of the data, and if the data does not exist in the server as a result of confirmation, providing a user interface to display a print interrupt.

The data may be print data.

The method according to embodiments of the present general inventive concept may further include receiving the print data from the server if the print data exists in the server, and printing the received print data.

The data may be at least one attachment data included in the print data.

The method according to embodiments of the present general inventive concept may further include receiving the attachment data from the server if the attachment data exists in the server, and printing the received attachment data.

The method according to embodiments of the present general inventive concept may further include receiving the print data from the server if the print data exists in the server as a result of confirmation, analyzing the received print data, and if the print data includes a URL that corresponds to at least one attachment data as a result of analysis, confirming whether the attachment data exists from the server that corresponds to the URL of the respective attachment data.

The method according to embodiments of the present general inventive concept may further comprise if it is judged that the attachment data exists as a result of confirmation, receiving the attachment data from the server that corresponds to the URL of the respective attachment data, attaching the attachment data to the print data to print the data, and if it is judged that the attachment data does not exist as a result of confirmation, providing the user interface to display an indication that the attachment data does not exist.

The method according to embodiments of the present general inventive concept may further comprise receiving a part of the attachment data from the server if the attachment data exists in the server as a result of confirmation, confirming a format of the attachment data, and providing the user interface to display the confirmed format of the attachment data.

The format of the attachment data may be at least one of a JPEG (Joint Photographic Coding Experts Group), TIFF (Tag Image File Format), PDF (Portable Document Format), GIF (Graphics Interchange Format), and BMP (BitMaP).

The method according to embodiments of the present general inventive concept may further include confirming whether the server operates, and providing the user interface to display whether the server operates according to the result of confirmation.

The foregoing and/or other aspects and utilities of the present general inventive concept may also be achieved by providing a computer readable recording medium having embodied thereon a computer program to execute a method, wherein the method includes receiving a uniform resource location (URL) of data, confirming whether the data exists from a server that corresponds to the URL of the data, and if the data does not exist in the server as a result of the confirmation, providing a user interface to display a print interrupt.

The method may further include receiving the data from the server if the data exists in the server; and printing the received data.

The foregoing and/or other aspects and utilities of the present general inventive concept may also be achieved by providing an image forming apparatus, including a universal plug and play (UPnP) unit to request data from a server that corresponds to a uniform resource location (URL) of the data, and to receive the data from the server, a control unit to confirm whether data exists from a server that corresponds to the URL of the data if the URL of the data is received, a user interface unit to provide a user interface to display whether the data exists, and a print unit to print the data received from the host device and the server on a printing paper under the control of the control unit.

The data may include attachment data.

The foregoing and/or other aspects and utilities of the present general inventive concept may also be achieved by providing an image forming method, the method including requesting and receiving data from a server that corresponds to a uniform resource location (URL) of the data, confirming whether data exists from a server that corresponds to the URL of the data if the URL of the data is received, providing a user interface to display whether the data exists, and printing the data received on a printing paper.

The foregoing and/or other aspects and utilities of the present general inventive concept may also be achieved by providing a computer readable recording medium having embodied thereon a computer program to execute a method, wherein the method includes requesting and receiving data from a server that corresponds to a uniform resource location (URL) of the data, confirming whether data exists from a server that corresponds to the URL of the data if the URL of the data is received, providing a user interface to display whether the data exists, and printing the data received on a printing paper.

The foregoing and/or other aspects and utilities of the present general inventive concept may also be achieved by providing an image forming apparatus, including a universal plug and play (UPnP) unit to receive data from a server, a control unit to confirm the received data according to a URL of the data, and a print unit to print the data according to the confirmation of the control unit.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
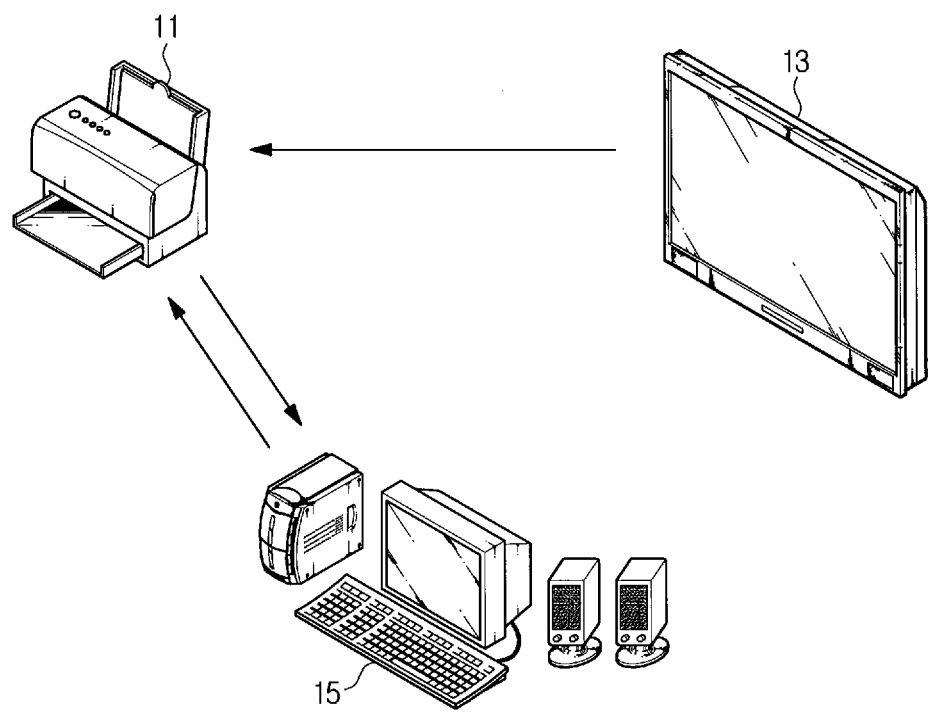
FIG. 1 is a view schematically illustrating a conventional home network system.
Figure 2:
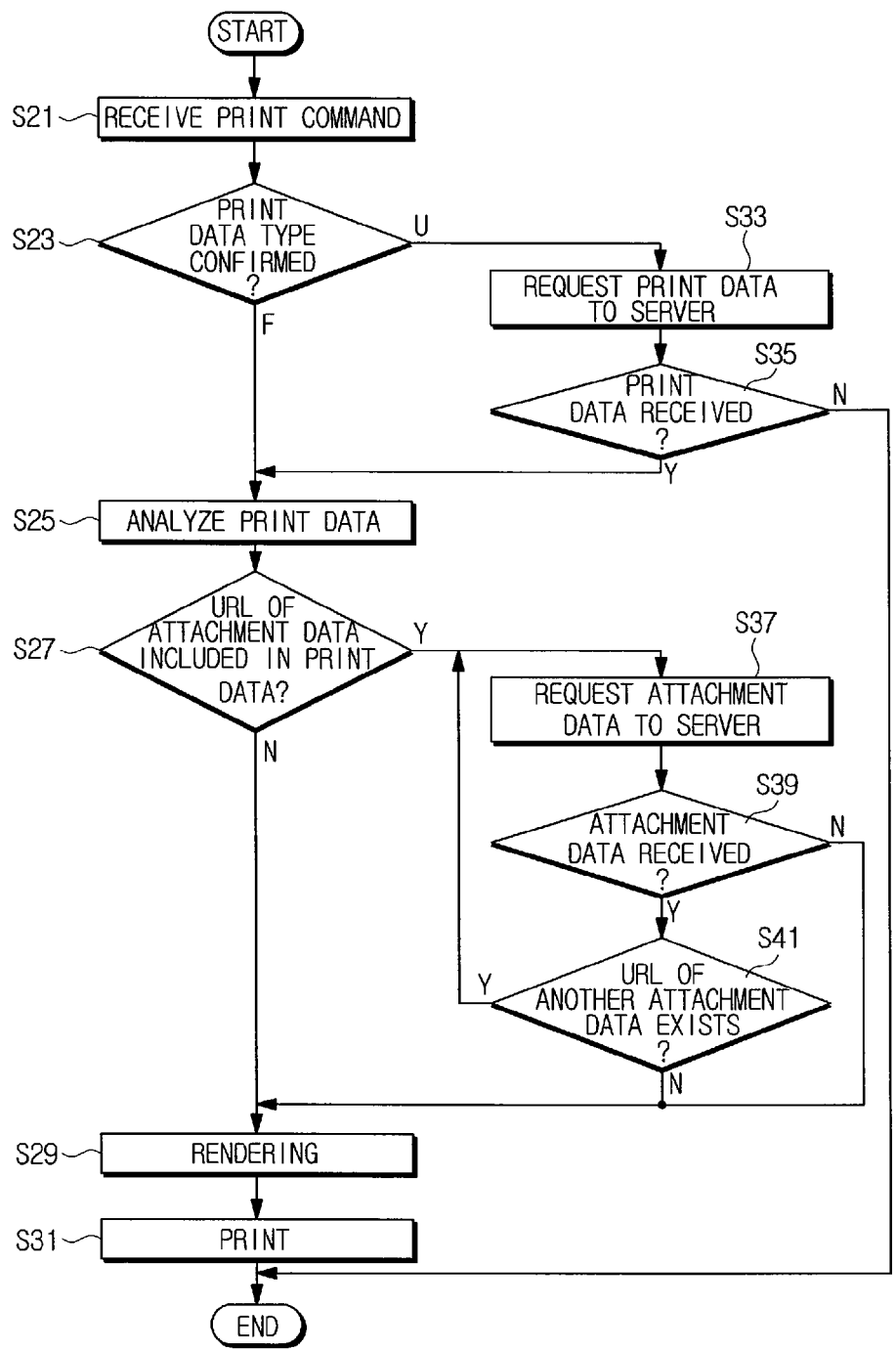
FIG. 2 is a flowchart illustrating a conventional image forming method using a UPnP printing service.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
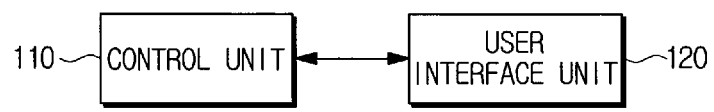
FIG. 3 is a block diagram illustrating a construction of an image forming apparatus to provide data information according to an embodiment of the present general inventive concept.

FIG. 3 is a block diagram illustrating a construction of an image forming apparatus to provide data information according to an embodiment of the present general inventive concept.

Referring to FIG. 3, an image forming apparatus 100 includes a control unit 110 and a user interface unit 120.

The image forming apparatus 100 can receive data from a host device or transmit data to the host device using a universal plug and play (UPnP). The host device may be a personal computer, a PDA, a notebook computer, a DTV, a set top box, a VCR, a DVD, a camcorder, etc. The image forming apparatus 100 may be implemented by a printer, a multifunction peripheral (MFP), a facsimile, etc.

The control unit 110 controls the image forming apparatus 100. If a uniform resource location (URL) of the data is received from the host device, the control unit 110 can confirm whether the data exists and originates from the server that corresponds to the URL of the data.

If the URL of the data which indicates a position of a server in which the data exists is received from the host device, the control unit can confirm whether the data exists in a server that corresponds to the URL of the data. The data may include printable data, and may include print data or attachment data included in the print data.

An example of a method of confirming the whether the data exists and originates from the server that corresponds to the URL will now be described with reference to a HEAD method among HTTP protocol methods. Assuming that the URL of the data is "10.88.193.12" and the data name is "test.jpg", the control unit 110 may request data information from the server as follows.

```
⌐HEAD/test.jpg HTTP/1.0
Connection : Keep-Alive
User-Agent : Mozilla/2/02Gold (WinNT; I)
Host : 10.88.193.12
Accept : image/gif, image/x-xbitmap, image/jpeg, image/pjpeg, */*⌐
```

In response to this request, the server that corresponds to the URL provides the data information as follows.

```
⌐HTTP/1.0 200 Document follows
Date : Fri, 20 Sep 1996 08:17:58 GMT
Server : NCSA/1.5.2
Last-modified : Mon, 17 Jun 1996 21:53;08 GMT
Content-type : image/jpg
Content-length : 2482⌐
```

Specifically, the control unit 110 receives only the data information, such as time, when the data is modified (Last-modified), data format (Content-type), and data size (Content-length), from the server, but does not receive actual data. Here, the actual data can be received from the corresponding server through a GET method.

Accordingly, if the data exists in the server that corresponds to the URL of the data, the server provides the data information in response, while if the data does not exist, the server does not provide the data information. Accordingly, the control unit can confirm whether the data exists from the corresponding server.

The control unit 110 can control the user interface unit 120 to provide a user interface to display an indication that the data exists in the server that corresponds to the URL of the data to a user if the data exists in the corresponding server, and to display an indication that the data does not exist in the corresponding server if the data does not exist in the corresponding server.

The user interface unit 120 can display a menu screen through which a user can input commands and/or set options. Also, the user interface unit 120 can provide a user interface to display an indication of whether the data exists under the control of the control unit 110.

Figure 4:
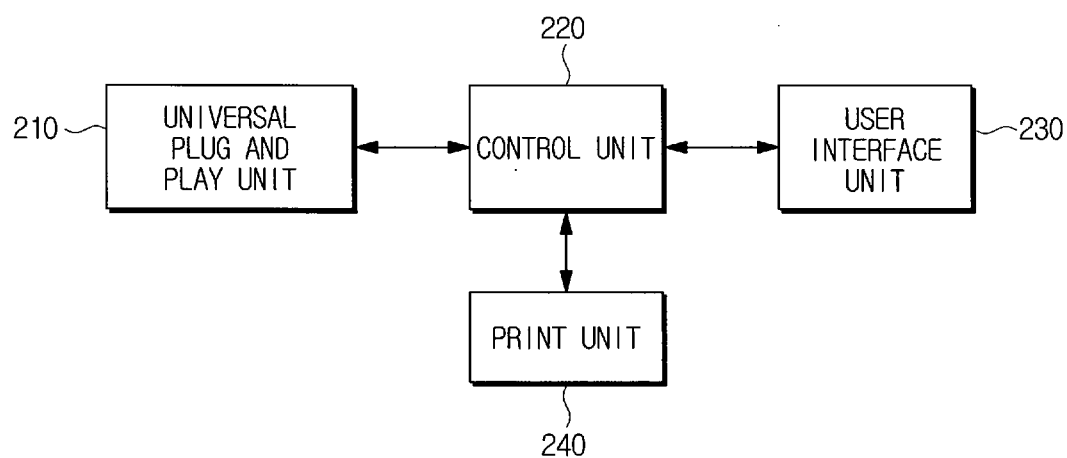
FIG. 4 is a block diagram illustrating a construction of an image forming apparatus to provide data information according to another embodiment of the present general inventive concept.

FIG. 4 is a block diagram illustrating a construction of an image forming apparatus to provide data information according to another embodiment of the present general inventive concept.

Referring to FIG. 4, the image forming apparatus 200 comprises a universal plug and play (UPnP) unit 210, a control unit 220, a user interface unit 230, and a print unit 240.

The UPnP unit 210 searches and controls network devices, such as an Internet gateway and home devices, and services using the UPnP.

The UPnP unit 210 requests data to the server that corresponds to the URL of the data, and receives the data from the server.

In addition, the UPnP unit 210 confirms whether the server operates. That is, the UPnP unit 210 requests the operation state of the server to the server, and receives the operation state from the server.

Accordingly, the UPnP unit 210 dynamically connects to a network and receives its IP address using a standard TCP/IP and an Internet protocol, performs the corresponding operation, and receives information corresponding to whether other devices exist and their corresponding functions. Thus, the UPnP unit 210 can directly communicate with the other devices.

The control unit 220 performs the same function as the control unit 110 of FIG. 3. If a print command is received from the host device, the control unit 220 can receive the print data simultaneously with the reception of the print command.

The control unit 220 confirms the type of the print data received from the host device. The print data may be classified into a file type and a URL type. If the URL type print data is received, the control unit 220 can receive the print data by requesting the print data from the server that corresponds to the URL through the UPnP unit 210. The file type print data may be printable data, and the URL type print data is the URL of the print data that indicates the position of the server in which the print data exists.

The control unit 220 may also confirm whether the print data exists in the server that corresponds to the URL of the print data. If the print data does not exist in the server that corresponds to the URL of the print data, the control unit 220 may control the user interface unit 230 to provide the user interface to reject the print request.

Accordingly, the control unit 220 confirms whether the print data exists before the control unit 220 requests the print data, and informs the user that the print request is rejected due to the nonexistence of the print data, so that a abnormal interruption of the printing due to the nonexistence of the print data and a malfunction of the image forming apparatus can be prevented.

In addition, the control unit 220 may confirm whether the URL of the attachment data exists in the print data by analyzing the print data received from the host device or the server. Accordingly, the control unit can confirm whether the attachment data exists in the print data.

If the attachment data exists in the print data as a result of a confirmation, the control unit 220 may receive the attachment data by requesting the attachment data from the server that corresponds to the URL through the UPnP unit 210. If the attachment data does not exist in the server that corresponds to the URL of the attachment data, the control unit 220 controls the user interface unit 230 to provide the user interface to display an indication of the nonexistence of the attachment data or to reject the print request.

Accordingly, the control unit 220 confirms whether the attachment data exists before requesting the attachment data, and informs the user that the attachment data does not exist, so that unnecessary printing, without indicating the attachment data in the print data due to the nonexistence of the attachment data, can be prevented during the printing of the print data.

In contrast, if the attachment data exists in the server that corresponds to the URL of the attachment data, the control unit 220 requests a portion of the attachment data from the server that corresponds to the URL through the UPnP unit 210, and receives the portion of the attachment data from the server.

The control unit 220 can confirm the format of the attachment data on the basis of the received part of the attachment data. The format of the attachment data may be any one of a JPEG (Joint Photographic Coding Experts Group), TIFF (Tag Image File Format), PDF (Portable Document Format), GIF (Graphics Interchange Format), and BMP (BitMaP).

A method of receiving a part of the attachment data will now be described. Specifically, a Partial Get method among HTTP protocol methods will be described. Assuming that the URL of the attachment data is "10.88.193.12" and the name of the attachment data is "test1.jpg", the control unit 110 requests a part of the attachment data to the server as follows.

```
GET/test1.jpg HTTP/1.1
Host : 10.88.193.12
Accept : */*
Connection : Close
Range : bytes=0–200
```

In response to this request, the server that corresponds to the URL provides only a head part, which has a size of 200 bytes, of the "test.jpg" attachment data.

Accordingly, the user can receive only a desired portion of the attachment data. The head part of the attachment data, which has a size of 200 bytes, refers to a part corresponding to a header, and when the header part of the attachment data is received, the format of the attachment data can be confirmed.

The control unit 220 controls the user interface unit 230 to provide the user interface to display the confirmed format of the attachment data. Accordingly, the user can confirm in advance whether the attachment data is data in a format desired by the user.

In addition, the control unit 220 confirms whether the server that corresponds to the URL of the print data or the attachment data operates. Accordingly, the control unit 220 may request operation state information from the server through the UPnP unit 210, and receives the operation state information from the server.

A method of receiving the operation state information of the server will now be described. Specifically, an OPTION method among HTTP protocol methods will be described. Assuming that the URL of the data is "10.88.193.12" and the data name is "test.jpg", the control unit 110 requests the operation state information to the server as follows.

```
OPTION * HTTP/1.1
Host : 10.88.193.12
Compliance : *
```

In response to this request, the server provides the operation state information as follows.

```
┌─────────────────────────────────────────────────┐
│  ΓHTTP/1/1 200 OK                               │
│  Date : Tue, 22 Jul 1997 20:21:51 GMT           │
│  Server : Super Proxy/1.0                       │
│  Public : OPTIONS, GET, HEAD, PUT, POST, TRACE  │
│  Compliance : rfc=1543, rfc=2068, hdr=set-proxy │
│  Content-Length : 0⤶                            │
└─────────────────────────────────────────────────┘
```

If the server is operating, the server provides the operation state information indicating that the operation state of the server is OK. If the server is not operating, the server does not provide the operation state information. Accordingly, the control unit 220 can confirm whether the server operates.

Specifically, if the server that corresponds to the URL of the data operates, the control unit 220 displays that the server is operating to the user, while if the server is not operating, it controls the user interface unit 230 to provide the user interface to display an indication that the server is not operating.

The user interface unit 230 may perform the same function as the user interface unit 230 of FIG. 3. In addition, the user interface unit 230 provides the user interface to display the format of the attachment data under the control of the control unit 220, and provides the user interface to display an indication of whether the server operates.

The print unit 240 prints the print data received from the host device and the server and the attachment data included in the print data on a printing paper under the control of the control unit 220.

FIGS. 5 to 8 are flowcharts illustrating an image forming method according to embodiments of the present general inventive concept. FIGS. 3-4 shall be referenced accordingly.

Figure 5:
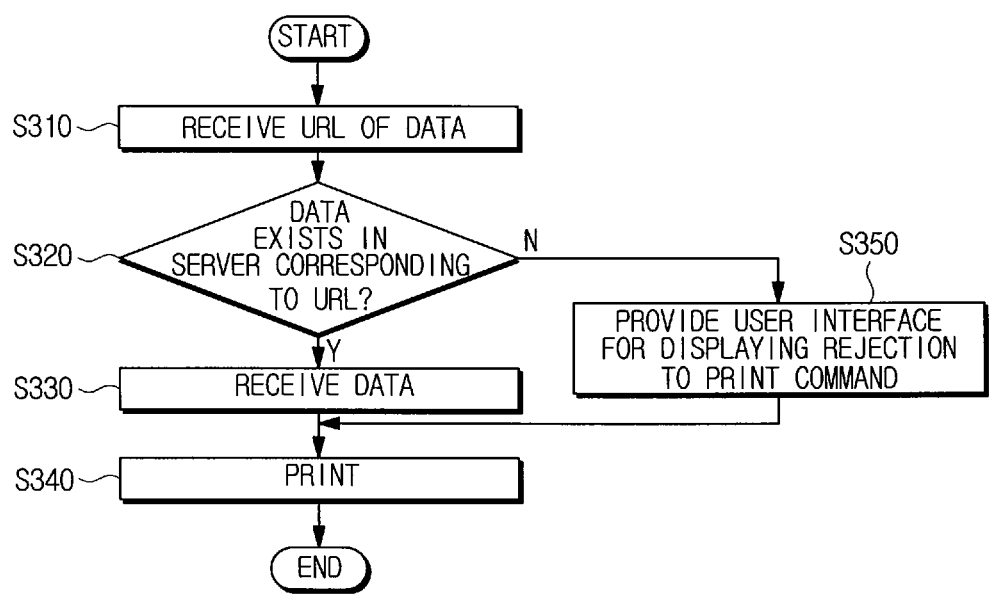
FIGS. 5 to 8 are flowcharts illustrating an image forming method according to embodiments of the present general inventive concept.

Referring to FIG. 5, if a print command and a URL of data are simultaneously received from a host device in operation S310, the image forming apparatus according to an embodiment of the present general inventive concept confirms whether the data exists in a server that corresponds to the URL of the data in operation S320.

If the data exists in the server that corresponds to the URL as a result of a confirmation in operation S320, the image forming apparatus receives the data from the server in operation S330, and then prints the received data in operation S340.

In contrast, if the data does not exists in the server that corresponds to the URL as a result of a confirmation in operation S320, the image forming apparatus provides a user interface to display a rejection to the print request in operation S350.

Figure 6:
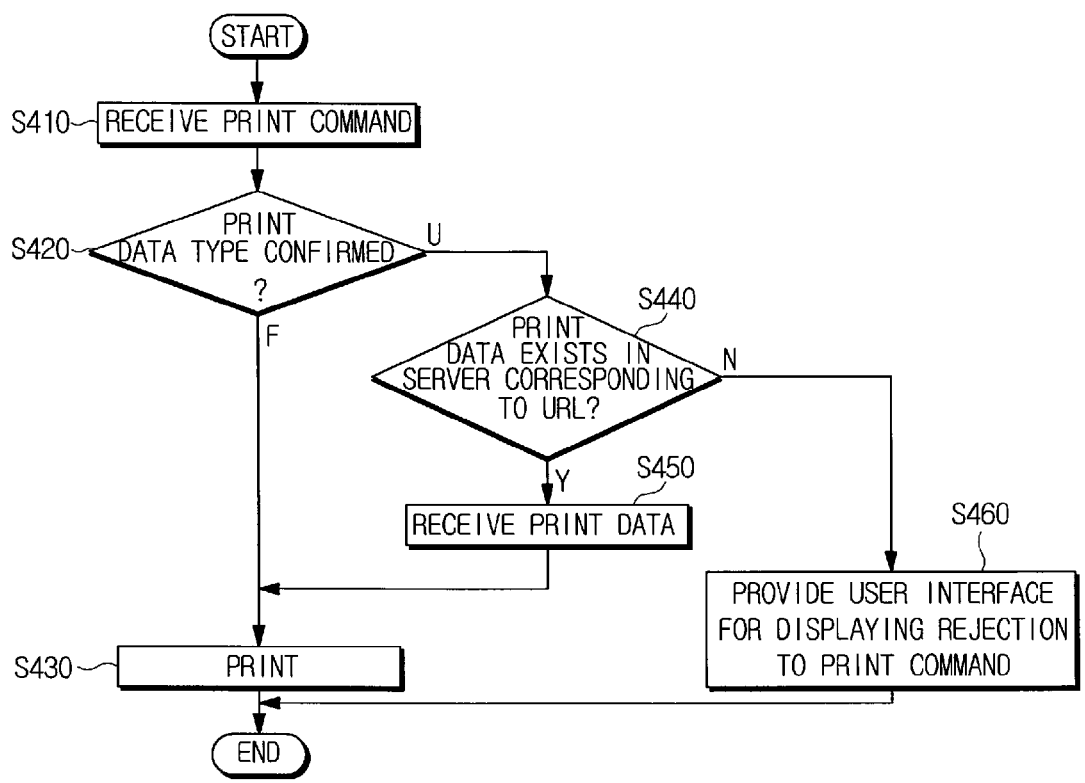

Referring to FIG. 6, if a print command and a URL of print data are simultaneously received from a host device in operation S410, the image forming apparatus according to another embodiment of the present general inventive concept confirms the type of the print data in operation S420. Here, the print data may be file type print data or URL type print data.

If the print data is the URL type print data as a result of a confirmation in operation S420, the image forming apparatus confirms whether the print data exists in a server that corresponds to the URL in operation S440. If the print data exists in the server as a result confirmation in operation S440, the image forming apparatus receives the print data from the server in operation S450.

The image forming apparatus may print the print data received from the server in operation S430.

If the print data does not exist in the server in operation S440, the image forming apparatus provides a user interface to display a rejection to the print request in operation S460.

Accordingly, by confirming in advance whether the print data exists and informing the user of the result of confirmation, malfunction of the image forming apparatus can be prevented.

Figure 7:
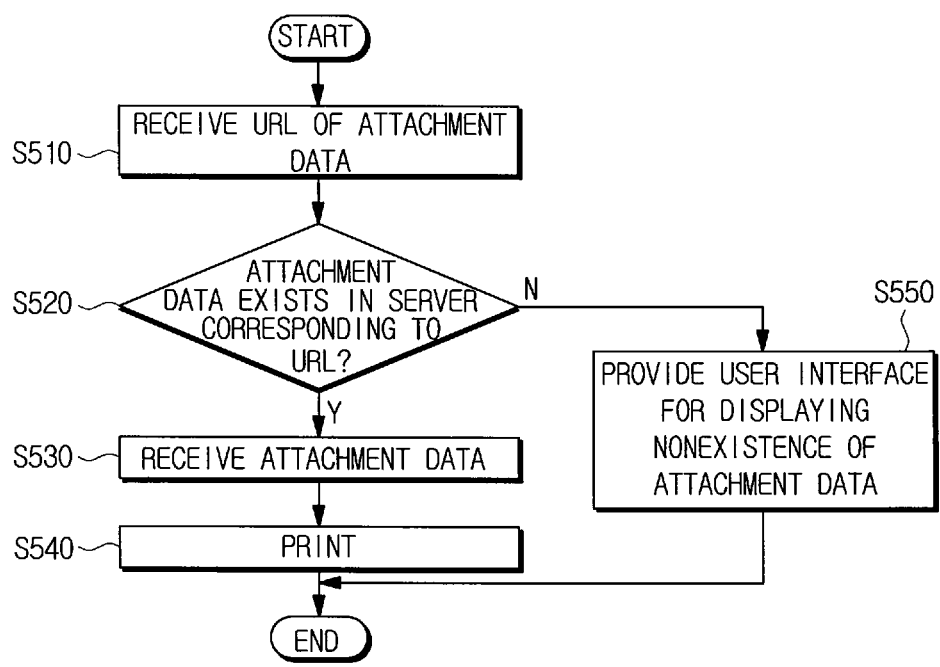

Referring to FIG. 7, if a print command and a URL of attachment data are simultaneously received from a host device in operation S510, the image forming apparatus according to another embodiment of the present general inventive concept confirms whether the attachment data exists in a server that corresponds to the URL in operation S520.

If the attachment data exists in the server that corresponds to the URL as a result of a confirmation in operation S520, the image forming apparatus receives the attachment data from the server in operation S530, and then prints the received attachment data in operation S540.

In contrast, if the attachment data does not exists in the server that corresponds to the URL as a result of a confirmation in operation S520, the image forming apparatus provides a user interface to display and indication of the nonexistence of the attachment data in operation S550.

Accordingly, by confirming in advance whether the attachment data exists, and informing the user of the result of the confirmation, the image forming apparatus can prevent unnecessary printing.

Figure 8:
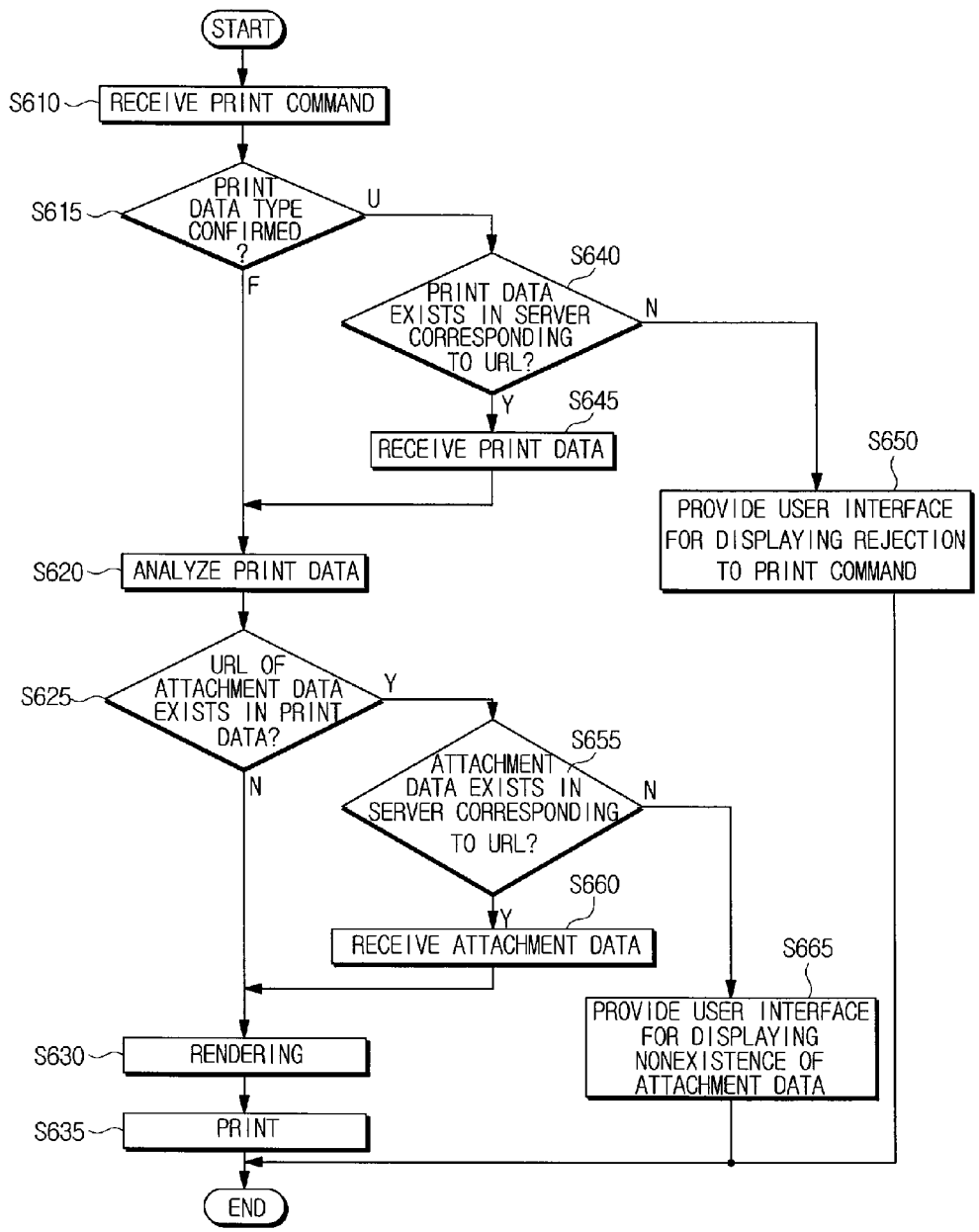

Referring to FIG. 8, if a print command and a URL of print data are simultaneously received from a host device in operation S610, the image forming apparatus according to another embodiment of the present general inventive concept confirms the type of the print data in operation S615. The print data may be file type print data or URL type print data.

If the print data is the file type print data as a result of a confirmation in operation S615, the image forming apparatus analyzes the print data received from the host device in operation S620. If the URL of the attachment data exists in the print data as a result of an analysis in operation S625, the image forming apparatus confirms whether the attachment data exists in the server that corresponds to the URL of the attachment data in operation S655. If the attachment data exists in operation S655, the image forming apparatus receives the attachment data from the server in operation S660, attaches the attachment data to the print data, performs rendering of the data in operation S630, and then prints the data in operation S635.

If the attachment data does not exist in operation S655, the image forming apparatus provides the user interface to display an indication of the nonexistence of the attachment data in operation S665.

In contrast, if the print data is the URL type print data as a result of a confirmation in operation S615, the image forming apparatus confirms whether the print data exists in the server that corresponds to the URL in operation S640. If the print data exists in the server as a result of a confirmation in operation S640, the image forming apparatus receives the print data from the server in operation S650, and then performs operation S620.

If the print data does not exist in the server in operation S640, the image forming apparatus provides the user interface to display a rejection to the print request in operation S650.

Accordingly, malfunction of the image forming apparatus and unnecessary printing can be prevented.

Figure 9:
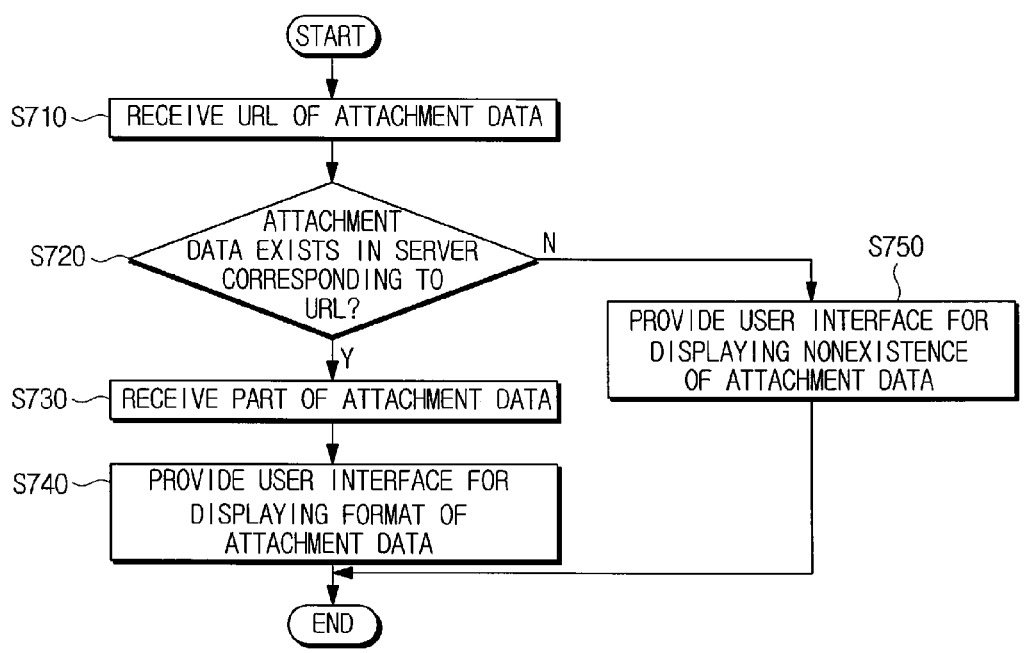
FIG. 9 is a flowchart illustrating a method of confirming a format of attachment data according to an embodiment of the present general inventive concept.

FIG. 9 is a flowchart illustrating a method of confirming the format of attachment data according to an embodiment of the present general inventive concept.

Referring to FIGS. 3-4, and 9, if the URL of the attachment data is received from the host device in operation S710, the image forming apparatus confirms whether the attachment data exists in the server that corresponds to the URL in operation S720.

If the attachment data exists in the server that corresponds to the URL in operation S720, the image forming apparatus receives a part of the attachment data from the server in operation S730. The image forming apparatus may confirm the format of the attachment data by receiving the received part of the attachment data, and may provide the user interface to display the format of the attachment data in operation S740.

In contrast, if the attachment data does not exist in the server that corresponds to the URL in operation S720, the image forming apparatus provides the user interface to display and indication of the nonexistence of the attachment data in operation S750.

Accordingly, it can be confirmed whether the file has the format desired by the user.

Figure 10:
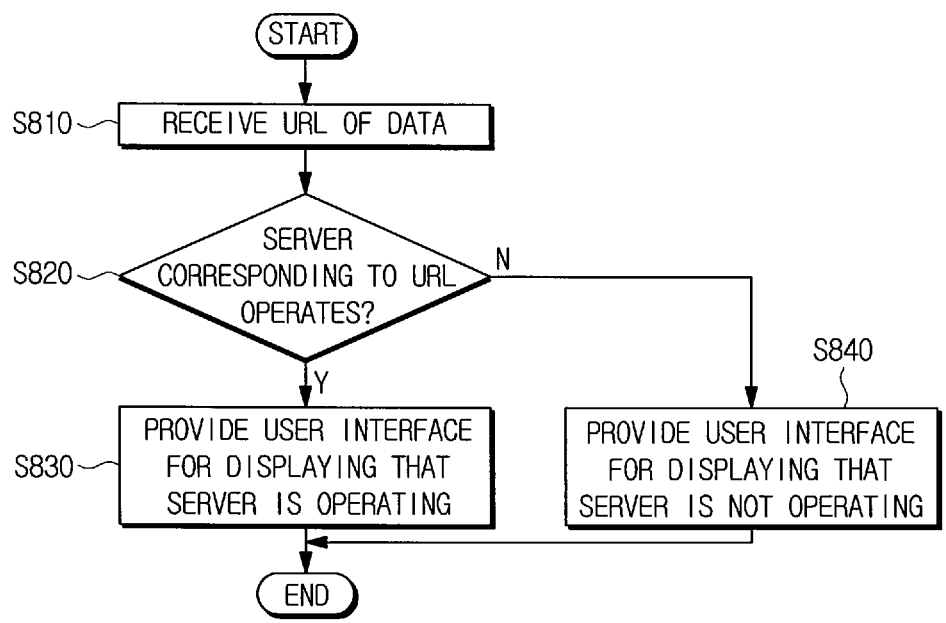
FIG. 10 is a flowchart illustrating a method of confirming whether a server operates according to an embodiment of the present general inventive concept.

FIG. 10 is a flowchart illustrating a method of confirming whether a server operates according to an embodiment of the present general inventive concept.

Referring to FIGS. 3-4, and 10, if the URL of the data is received from the host device in operation S810, the image forming apparatus confirms the operation state of the server that corresponds to the URL of the data in operation S820.

If the server operates as a result of a confirmation in operation S820, i.e., if the image forming apparatus receives operation state information from the server, the image forming apparatus provides the user interface to display that the server operates in operation S830.

In contrast, if the server does not operate in operation S820, the image forming apparatus provides the user interface to display that the server does not operate in operation S840.

Accordingly, it can be known in advance whether the data can be received.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As described above, according to the present general inventive concept, by confirming in advance whether the data exists in the server that corresponds to the URL of the data and informing the user of the result of confirmation, malfunction of the image forming apparatus and unnecessary printing can be prevented.

In addition, since the format of the attachment data can be known by receiving a part of the attachment data, the data of the format desired by the user can be printed.

Furthermore, by confirming whether the server operates, it can be known whether the data can be received.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
a control unit to receive a request to access print data from a server that corresponds to a uniform resource location (URL), to confirm whether the print data is a file type or a URL type before requesting the print data from the server, and if the print data is the URL type, then confirming whether the print data exists on the server by requesting data information corresponding to the print data from the server before requesting the print data from the server;
a user interface unit to display a print rejection when the print data, if the print data is the URL print data, does not exist in the server; and
a print unit to print the print data, if the print data is the file type, without confirming the existence of the print data and to print the print data, if the print data is the URL type, when the print data exists in the server.

2. The image forming apparatus of claim 1, wherein:
the print data includes attachment data.

3. The image forming apparatus of claim 2, wherein:
the control unit receives the attachment data from the server when the attachment data exists in the server and controls the print unit to print the received attachment data; and
when the attachment data does not exist in the server, the control unit controls the user interface unit to provide a user interface to display an indication that the attachment data does not exist.

4. The image forming apparatus of claim 1, wherein:
the control unit receives and analyzes the print data from the server when the print data exists in the server; and
when the print data includes a second URL that corresponds to at least one attachment data, the control unit confirms whether the at least one attachment data exists on the server that corresponds to the second URL.

5. The image forming apparatus of claim 4, wherein when it is judged that the at least one attachment data exists, the control unit receives the at least one attachment data from the server that corresponds to the second URL, attaches the at least one attachment data to the print data, and prints the at least one attachment data; and
when it is judged that the at least one attachment data does not exist, the control unit controls the user interface unit to provide a user interface to display an indication that the at least one attachment data does not exist.

6. The image forming apparatus of claim 4, wherein the control unit receives a part of the at least one attachment data from the server before requesting all of the at least one attachment data from the server, confirms a format of the at least one attachment data according to the format of the part of the at least one attachment data, and controls the user interface unit to display the confirmed format of the at least one attachment data.

7. The image forming apparatus of claim 2, wherein the control unit receives a part of the attachment data from the server before requesting all of the attachment data from the server, confirms a format of the attachment data according to the format of the part of the attachment data, and controls the user interface unit to display the confirmed format of the attachment data.

8. The image forming apparatus of claim 2, wherein a format of the attachment data is at least one of a JPEG (Joint Photographic Coding Experts Group), TIFF (Tag Image File Format), PDF (Portable Document Format), GIF (Graphics Interchange Format), and BMP (BitMaP).

9. The image forming apparatus of claim 1, wherein the control unit confirms whether the server operates and controls the user interface unit to provide a user interface to display whether the server operates.

10. An image forming method, comprising:
receiving a first uniform resource location (URL) of print data;
confirming whether the print data is one of a file type and a URL type before requesting the print data from the server;
if the print data is the URL type, confirming whether the print data exists on a server that corresponds to the first URL of the print data by requesting information corresponding to the print data from the server before requesting the print data from the server;
when the print data is the URL type and the print data does not exist in the server, displaying a print rejection to a user interface;
receiving the print data, which is the file type, from the server without confirming the existence of the print data;
receiving the print data, which is the URL type, from the server when the print data exists in the server; and
printing the received print data.

11. The image forming method of claim 10, wherein the print data includes attachment data.

12. The image forming method of claim 11, further comprising:
receiving the attachment data from the server when the attachment data exists in the server; and
printing the received attachment data.

13. The image forming method of claim 10, further comprising:
receiving the print data from the server when it is determined as a result of the confirmation that the print data exists in the server;
analyzing the received print data; and
when the print data includes a second URL that corresponds to at least one attachment data, confirming whether the at least one attachment data exists on the server or another server that corresponds to the second URL.

14. The image forming method of claim 13, further comprising:
when it is determined as a result of the confirmation that the at least one attachment data exists, receiving the at least one attachment data from the server or the another server that corresponds to the second URL, and attaching the at least one attachment data to the print data; and
when it is determined as a result of the confirmation that the at least one attachment data does not exist, displaying on the user interface an indication that the at least one attachment data does not exist.

15. The image forming method of claim 13, further comprising:
before receiving all of the at least one attachment data from the server or the another server, receiving a part of the at least one attachment data from the server when it is determined that the at least one attachment data exists in the server or the another server;
confirming a format of the at least one attachment data; and
displaying on the user interface the confirmed format of the at least one attachment data.

16. The image forming method of claim 11, further comprising:
before receiving all of the attachment data from the server, receiving a part of the attachment data from the server when it is determined that the attachment data exists in the server;
confirming a format of the attachment data; and
displaying on the user interface the confirmed format of the attachment data.

17. The image forming method of claim 11, wherein a format of the attachment data is at least one of a JPEG (Joint Photographic Coding Experts Group), TIFF (Tag Image File Format), PDF (Portable Document Format), GIF (Graphics Interchange Format), and BMP (BitMaP).

18. The image forming method of claim 10, further comprising:
confirming whether the server operates; and
displaying to the user interface an indicator regarding whether the server operates according to the result of confirmation.

19. A non-transitory computer readable recording medium having embodied thereon a computer program to execute a method, wherein the method comprises:
receiving a uniform resource location (URL) of print data;
confirming whether the print data is one of a file type and a URL type before requesting the print data from the server;
if the print data is the URL type, confirming whether the print data exists on a server that corresponds to the URL of the print data by receiving from the server information corresponding to the print data before receiving the print data;
when the print data is the URL type and the print data does not exist in the server, providing a user interface to display a print interrupt;
receiving the print data, which is the file type, from the server without confirming the existence of the print data;
receiving the print data, which is the URL type, from the server when the print data exists in the server; and
printing the received print data.

20. An image forming apparatus, comprising:
a universal plug and play (UPnP) unit to request print data from a server that corresponds to a uniform resource location (URL) of the print data, and to receive the print data from the server;
a control unit to confirm whether the print data is one of a file type and a URL type before requesting the print data from the server, and if the print data is the URL type, then confirming whether the print data exists on the server by requesting information corresponding to the print data from the server before the UPnP unit requests the print data from the server;
a user interface unit to display a print interrupt when the print data does not exist in the server; and
a print unit under the control of the control unit to print onto a printing paper the print data received from the server.

21. The image forming apparatus of claim 20, wherein the print data includes attachment data.

22. An image forming method, comprising:
requesting and receiving print data from a server that corresponds to a uniform resource location (URL) of the print data;
confirming whether the print data is one of a file type and a URL type before requesting, the print data from the server;
if the print data is the URL type, before requesting and receiving the print data, confirming whether the print data exists on the server by requesting information corresponding to the print data from the server;

providing a user interface to display a print interrupt when the print data, which is the URL type, does not exists in the server; and printing the print data received on a printing paper when the print data, which is the URL type, exists in the server.

23. A non-transitory computer readable recording medium having embodied thereon a computer program to execute a method, wherein the method comprises:

requesting and receiving partial print data from a server that corresponds to a uniform resource location (URL) of the print data to confirm if the print data is one of file type and URL type;

if the print data is URL type, before requesting and receiving an entire data of the print data, confirming whether the print data exists on the server by requesting from the server information that corresponds to the print data;

providing a user interface to display a print interrupt when the print data, which is URL type, does not exists in the server; and printing the print data received on a printing paper when the print data, which is URL type, exists in the server.

24. An image forming apparatus, comprising:

a universal plug and play (UPnP) unit to receive print data from a server;

a control unit to confirm whether the print data is one of a file type and a URL type before requesting the print data from the server, and if the print data is the URL type, then confirming, before the UPnP unit receives the print data from the server, whether the print data exists on the server by requesting from the server information corresponding to the print data; and a print unit to print the print data according to the confirmation of the control unit when the print data exists in the server.

* * * * *